United States Patent
Higashi

(10) Patent No.: US 11,409,158 B2
(45) Date of Patent: Aug. 9, 2022

(54) DISPLAY DEVICE

(71) Applicant: Mitsubishi Electric Corporation, Tokyo (JP)

(72) Inventor: Takuya Higashi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 140 days.

(21) Appl. No.: 17/060,401

(22) Filed: Oct. 1, 2020

(65) Prior Publication Data
US 2021/0116746 A1 Apr. 22, 2021

(30) Foreign Application Priority Data
Oct. 17, 2019 (JP) .............................. JP2019-190286

(51) Int. Cl.
*G02F 1/1335* (2006.01)

(52) U.S. Cl.
CPC .. *G02F 1/133528* (2013.01); *G02F 1/133531* (2021.01); *G02F 2201/56* (2013.01)

(58) Field of Classification Search
None
See application file for complete search history.

(56) References Cited

U.S. PATENT DOCUMENTS

2013/0328051 A1 * 12/2013 Franklin ................ H05K 1/028
361/679.01
2018/0321552 A1 11/2018 Sugihara et al.

FOREIGN PATENT DOCUMENTS

| JP | 2019-124905 A | 7/2019 |
| JP | 2020101574 A * | 7/2020 |
| WO | 2017-077963 A1 | 5/2017 |
| WO | WO-2019244916 A1 * | 12/2019 |

OTHER PUBLICATIONS

An Office Action; "Notice of Reasons for Refusal," mailed by the Japanese Patent Office dated Sep. 28, 2021, which corresponds to Japanese Patent Application No. 2019-190286 and is related to U.S. Appl. No. 17/060,401 with English translation.

* cited by examiner

*Primary Examiner* — Phu Vu
(74) *Attorney, Agent, or Firm* — Studebaker & Brackett PC

(57) ABSTRACT

An optical film is shaped so that a first normal drawn from a starting point of a curve to an outer periphery of an application region is longer than a second normal drawn from the starting point of the curve to an outer periphery of a display region, a third normal drawn from an end point of the curve to the outer periphery of the application region is longer than a fourth normal drawn from the end point of the curve to the outer periphery of the display region, and a fifth normal drawn from a single point on the curve located between the starting point and the end point of the curve to the outer periphery of the application region is shorter than each of the first normal and the third normal.

4 Claims, 4 Drawing Sheets

DISPLAY DEVICE

BACKGROUND OF THE INVENTION

Field of the Invention

The present invention relates to display devices including optical films.

Description of the Background Art

A display device displays a desired image on the surface thereof through control of luminance and color of light emitted from a plurality of pixels arranged in a matrix. On the surface of such a display device, a region to display an image is referred to as a display region. For control of luminance of each pixel or improvement of image display performance, an optical film having an optical function is sometimes applied to cover the display region on the surface of the display device. As the optical film, a polarizing plate or a phase difference plate for achieving a wider viewing angle is used, for example, in a liquid crystal display device.

The surface of the display device typically has a rectangular outline, and, in this case, the optical film applied to the surface is required to have a similar rectangular shape. However, there is a case where the display region has a non-rectangular outer peripheral shape or the surface of the display device includes a portion to which the optical film is not to be applied, and, in this case, an optical film having a non-rectangular outer peripheral shape is used to be applied. In a case where such an optical film is caused to have a desired outer peripheral shape, the optical film can have a recess on a portion of an outer peripheral shape thereof, but, if the recess is angular, the recess can cause cracking at outline processing in a process of manufacturing the optical film. The recess is caused to have a curved shape to suppress cracking, but internal stress of the optical film is likely to be concentrated on the recess even if the recess has the curved shape. The internal stress of the optical film can cause a malfunction of the display device. Examples of the malfunction of the liquid crystal display device include linear display failure caused by cracking of the optical film and reduction in black uniformity caused by photoelasticity of the optical film and a substrate.

Technology to solve a problem caused by the internal stress of the optical film as described above is disclosed in WO 2017/077963.

In a liquid crystal display device disclosed in WO 2017/077963, two polarizing plates each having a hole are applied to front and rear sides of a display panel in crossed Nicols, that is to say, so that polarizing axes are orthogonal to each other. A polarizing plate having a polarizing axis orthogonal to the length of a display region is likely to be cracked from a hole in a direction along the polarizing axis by internal stress occurring around the hole, and thus the hole of the polarizing plate having the polarizing axis orthogonal to the length of the display region is caused to have an increased diameter to suppress cracking of the polarizing plate on an edge of the hole.

WO 2017/077963, however, only discloses that one of the polarizing plates is caused to have a hole having a greater diameter than a hole of the other one of the polarizing plates, and thus concentration of internal stress of an optical film to be applied cannot be mitigated when the display region and a region to which the optical film is not to be applied are caused to have a desired shape without forming a hole in the optical film.

SUMMARY

The present disclosure has been conceived in view of a problem as described above, and it is an object to provide technology enabling mitigation of concentration of internal stress of an optical film in a case where a display region and a region to which the optical film is applied are caused to have a desired shape.

A display device according to the present disclosure includes an optical film applied within an application region set on a surface of a substrate having, on the surface thereof, a display region to display an image, and having a recess on a portion of an outer peripheral shape of the application region, wherein the optical film is shaped so that an outer peripheral shape of the optical film has a concave curve along the recess of the application region, a first normal drawn from a starting point of the curve to an outer periphery of the application region has a greater length than a second normal drawn from the starting point of the curve to an outer periphery of the display region, a third normal drawn from an end point of the curve to the outer periphery of the application region has a greater length than a fourth normal drawn from the end point of the curve to the outer periphery of the display region; and a fifth normal drawn from a single point on the curve located between the starting point and the end point of the curve to the outer periphery of the application region has a smaller length than each of the first normal and the third normal.

Concentration of internal stress of the optical film can be mitigated in a case where the region to which the optical film is applied and the display region are caused to have a desired shape.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
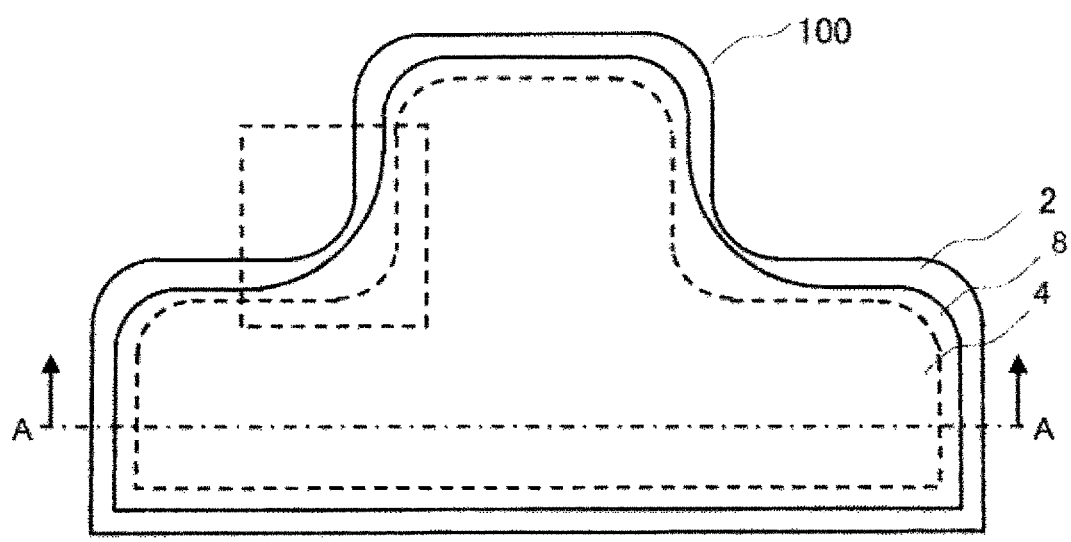
FIG. 1 is a plan view of a liquid crystal display device in Embodiment 1 of the present invention.

In Embodiment 1 of the present invention, description will be made by taking a liquid crystal display device having an outer peripheral shape having a recess as an example of a display device. FIG. 1 is a plan view of a liquid crystal display device 100, and FIG. 2 is a sectional view taken along the line A-A of FIG. 1.

Figure 2:
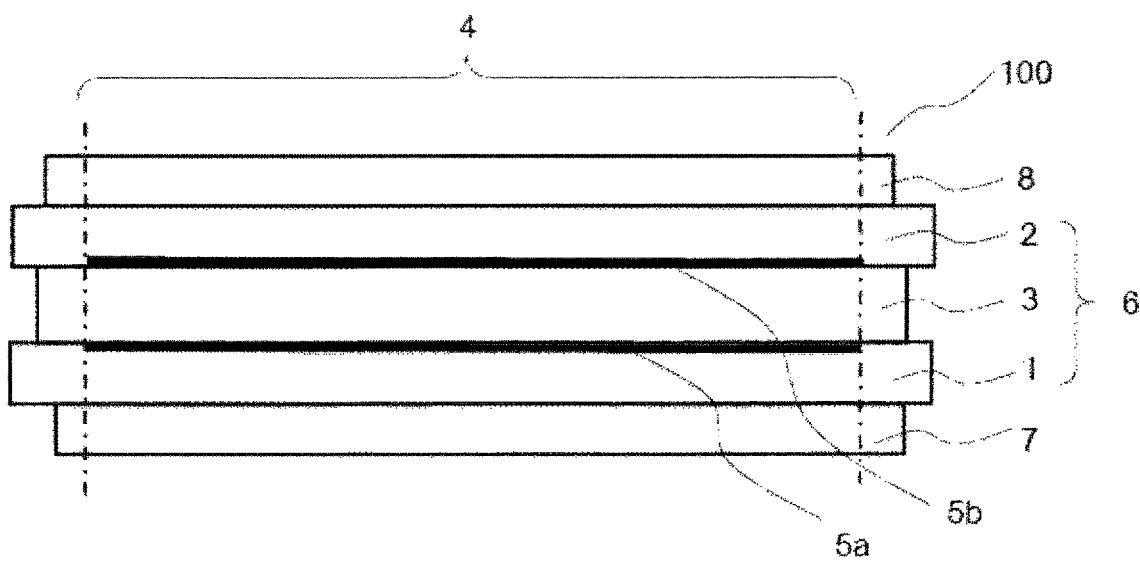
FIG. 2 is a sectional view of the liquid crystal display device in FIG. 1.

As illustrated in FIG. 2, an array substrate 1 and a color filter substrate 2 are arranged to oppose each other with a liquid crystal layer 3 therebetween in the liquid crystal display device 100.

On an upper surface, that is, a surface opposing the color filter substrate 2 of the array substrate 1, scanning wiring and signal wiring orthogonal to each other are arranged in a matrix, and a pixel electrode for driving a liquid crystal and a thin film transistor (hereinafter, TFT) for applying a voltage to the pixel electrode are disposed in a portion corresponding to each of intersections of the scanning wiring and the signal wiring. Upon application of the voltage to the pixel electrode by the TFT disposed in the portion corresponding to each of the intersections of the scanning wiring and the signal wiring, an electric field generated by the pixel electrode changes molecular orientation of the liquid crystal to thereby control transmission and blocking of light. A portion which corresponds to each of the intersections of the scanning wiring and the signal wiring and in which transmission and blocking of light are controlled is each of pixels of the liquid crystal display device 100. In FIG. 2, a region in which the pixels are arranged is shown as a pixel region 5a.

On a lower surface, that is, a surface opposing the array substrate 1 of the color filter substrate 2, a color material layer for determining color of each of the pixels is disposed, and a region in which the color material layer is disposed is shown as a pixel region 5b in FIG. 2.

The array substrate 1 and the color filter substrate 2 bonded together to oppose each other with the liquid crystal layer 3 therebetween as described above are referred to as a liquid crystal cell 6. In a state of the liquid crystal cell 6 being formed, the pixel regions 5a and 5b overlap each other, and a liquid crystal between the pixel regions 5a and 5b is driven by operation and action of components disposed in each of the pixel regions 5a and 5b to display an image. A region to display the image is referred to as a display region 4. FIG. 2 shows that a portion of the surface of each of the array substrate 1 and the color filter substrate 2 is the display region 4.

Polarizing plates 7 and 8 as optical films to cover the display region 4 are applied on opposite surfaces of the surfaces opposing each other of the array substrate 1 and the color filter substrate 2, that is, two surfaces of the liquid crystal cell 6. The polarizing plates 7 and 8 each have a function to change a polarization state of transmitted light and the like. The polarizing plates 7 and 8 are shaped to cover the display region 4 to exert the optical function of each of the polarizing plates 7 and 8 throughout the display region 4. On the other hand, the polarizing plates 7 and 8 are shaped not to extend beyond the array substrate 1 or the color filter substrate 2 because extension beyond the array substrate 1 or the color filter substrate 2 can cause cracking, separation, and the like. That is to say, in this case, a region to which the polarizing plates 7 and 8 can be applied is within a range of an outer periphery of the array substrate 1 or the color filter substrate 2.

With the above-mentioned configuration, as illustrated in FIG. 1, the polarizing plates 7 and 8 are each processed to have an outer peripheral shape included in a range between outer peripheral shapes of the array substrate 1 and the color filter substrate 2 and an outer peripheral shape of the display region 4, and are applied at appropriate locations. Since FIG. 1 is a plan view of the liquid crystal display device 100 as viewed from a side of the color filter substrate 2 in FIG. 2, the polarizing plate 7 is not illustrated, but the polarizing plate 7 has a similar shape to the polarizing plate 8 in FIG. 1 in a case where the liquid crystal display device 100 is viewed from a side of the array substrate 1.

The shape of each of the polarizing plates 7 and 8 will be described in more detail. Description will be made on the polarizing plate 8 below, but the same applies to the polarizing plate 7.

Figure 3:
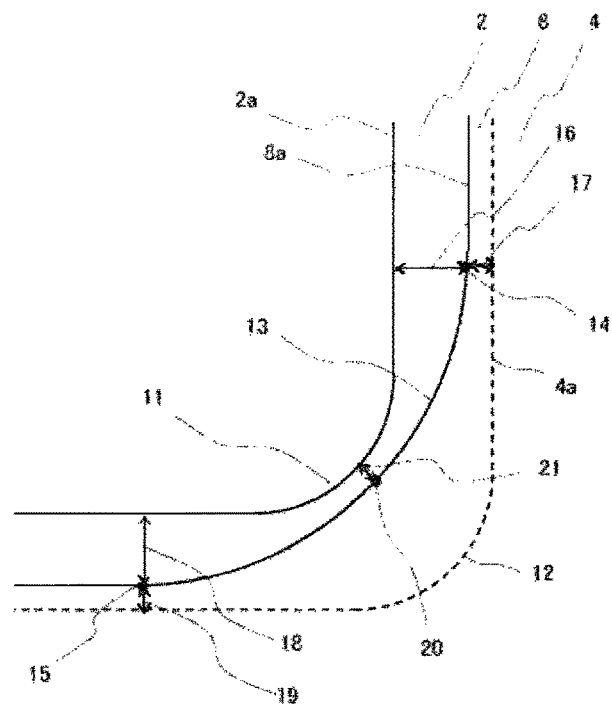
FIG. 3 is a plan view of an enlarged portion of the liquid crystal display device in FIG. 1.

As illustrated in FIG. 1, the array substrate 1, the color filter substrate 2, and the display region 4 of the liquid crystal display device 100 each have a protrusion on a portion of an outer peripheral shape thereof to thereby have two recesses. FIG. 3 is a plan view of an enlarged portion around a left recess of these recesses enclosed by a dotted line. An outer periphery 2a of the color filter substrate 2 has an arc 11 having a constant curvature at the recess, and an outer periphery 4a of the display region 4 shown by a dotted line has an arc 12 having a constant curvature at the recess.

An outer periphery 8a of the polarizing plate 8 has a curve 13 located between the outer periphery 2a of the color filter substrate 2 and the outer periphery 4a of the display region 4, and being concave to be dented in the same direction as the recess of the color filter substrate 2 along the recess of the color filter substrate 2. The curve 13 has a shape as described below.

First, a normal to the curve 13 is drawn from a starting point 14 of the curve 13 to the outer periphery 2a of the color filter substrate 2, and a line segment from the starting point 14 to a point where the normal to the curve 13 intersects with the outer periphery 2a of the color filter substrate 2 is defined as a first normal 16. A normal to the curve 13 is drawn from the starting point 14 to the display region 4, and a line segment from the starting point 14 to a point where the normal to the curve 13 intersects with the outer periphery 4a of the display region 4 is defined as a second normal 17.

A normal to the curve 13 is drawn from an end point 15 of the curve 13 to the outer periphery 2a of the color filter substrate 2, and a line segment from the end point 15 to a point where the normal to the curve 13 intersects with the outer periphery 2a of the color filter substrate 2 is defined as a third normal 18. A normal to the curve 13 is drawn from the end point 15 to the display region 4, and a line segment from the end point 15 to a point where the normal to the curve 13 intersects with the outer periphery 4a of the display region 4 is defined as a fourth normal 19.

Furthermore, as for an intermediate point 20 on the curve 13 located between the starting point 14 and the end point 15, a normal to the curve 13 is drawn from the intermediate point 20 to the outer periphery 2a of the color filter substrate 2, and a line segment from the intermediate point 20 to a point where the normal to the curve 13 intersects with the outer periphery 2a of the color filter substrate 2 is defined as a fifth normal 21.

In this case, the curve 13 has a smoothly curved shape meeting conditions that the first normal 16 has a greater length than the second normal 17, the third normal 18 has a greater length than the fourth normal 19, and the fifth normal 21 has a smaller length than each of the first normal 16 and the third normal 18.

The curved shape meeting such conditions is gentler than the arc 11 of the color filter substrate 2 because, in an application region to which the polarizing plate 8 can be applied, that is, in a region between the outer periphery 2a of the color filter substrate 2 and the outer periphery 4a of the display region, the starting point 14 and the end point 15 are closer to the display region 4 than to the outer periphery 2a of the color filter substrate 2, and the intermediate point 20 located between the starting point 14 and the end point 15 is closer to the outer periphery 2a of the color filter substrate 2 than the starting point 14 and the end point 15 are. The polarizing plate 8 having the curve 13 having such a curved shape is located within a range of the application region to which the polarizing plate 8 can be applied, that is, the outer periphery 2a of the color filter substrate 2, is shaped to have a range to cover the display region 4 as a whole, and, while meeting these conditions, has the curve 13 having a smaller curvature. This can mitigate stress concentration on the curve 13, and can suppress reduction in display quality and display failure of the liquid crystal display device 100 caused by stress concentration.

In Embodiment 1, a case where the recesses of the substrates to which the polarizing plates 7 and 8 are applied, that is, the array substrate 1 and the color filter substrate 2 and the recess of the display region 4 each have an arc having a constant curvature is shown, but the shape of the recess is not limited to this shape, and may be curved to have a plurality of arcs or be angular, for example.

Embodiment 2

In Embodiment 1 described above, the liquid crystal display device in which the outer peripheral shape of each of the array substrate 1 and the color filter substrate 2 matches the outer peripheral shape of the application region has been described. In Embodiment 2, a liquid crystal display device 101 in which the application region does not have the outer peripheral shape of each of the array substrate 1 and the color filter substrate 2 but has a shape determined by another factor will be described.

Figure 4:
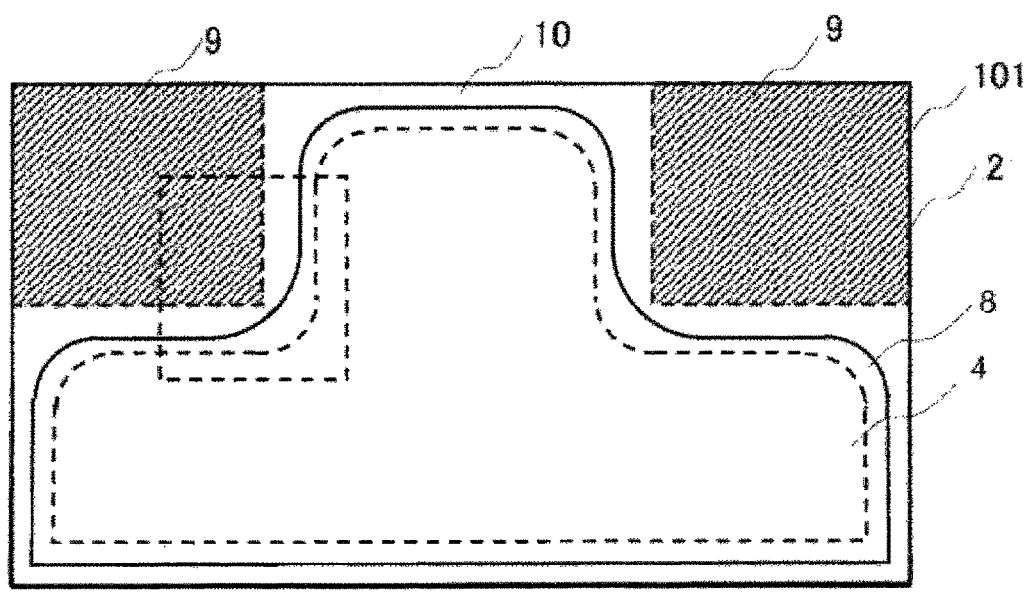
FIG. 4 is a plan view of a liquid crystal display device in Embodiment 2 of the present invention.
Figure 5:
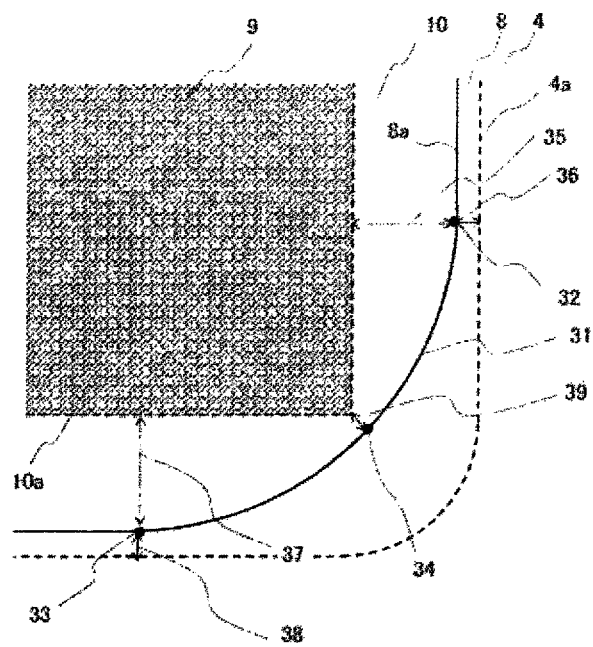
FIG. 5 is a plan view of an enlarged portion of the liquid crystal display device in FIG. 4.

FIG. 4 is a plan view of the liquid crystal display device 101 in Embodiment 2, and FIG. 5 is a plan view of an enlarged portion in FIG. 4. As illustrated in FIG. 4, the liquid crystal display device 101 has the non-rectangular display region 4 having a protrusion on a portion thereof as in Embodiment 1, and the display region 4 has two recesses.

On the other hand, the color filter substrate 2 has a rectangular outer peripheral shape in contrast to that in Embodiment 1. At two corners, that is, an upper right corner and an upper left corner in FIG. 4, of the color filter substrate 2, non-application regions 9 to which a film, such as a polarizing plate, cannot be applied are set. The non-application regions 9 are set, for example, to secure a region in which light is not to be unnecessarily attenuated by a polarizing plate and the like as a region in which light emitted and sensed by another device, such as an infrared sensor and a LED indicator, mounted on an apparatus into which the liquid crystal display device 101 is incorporated is transmitted. As a result of setting the non-application regions 9, an application region 10 to which the polarizing plate 8 can be applied has a protruding shape obtained by eliminating the non-application regions 9 from the rectangular outer peripheral shape of the color filter substrate 2, and the shape of the application region 10 is roughly similar to that of the display region 4. In Embodiment 1, the array substrate 1 and the color filter substrate 2 each have the outer peripheral shape of the application region, and have two recesses. In Embodiment 2, the application region 10 also has two recesses.

In Embodiment 2, the outer peripheral shape of the polarizing plate 8 has a curve 31 located between an outer periphery 10a of the application region 10 and the outer periphery 4a of the display region 4, and being concave to be dented in the same direction as a recess of the application region 10 along the recess of the application region 10 as in Embodiment 1. The curve 31 has a shape as described below.

First, a normal to the curve 31 is drawn from a starting point 32 of the curve 31 to the outer periphery 10a of the application region 10, and a line segment from the starting point 32 to a point where the normal to the curve 31 intersects with the outer periphery 10a of the application region 10 is defined as a first normal 35. A normal to the curve 31 is drawn from the starting point 32 to the display region 4, and a line segment from the starting point 32 to a point where the normal to the curve 31 intersects with the outer periphery 4a of the display region 4 is defined as a second normal 36.

A normal to the curve 31 is drawn from an end point 33 of the curve 31 to the outer periphery 10a of the application region 10, and a line segment from the end point 33 to a point where the normal to the curve 31 intersects with the outer periphery 10a of the application region 10 is defined as a third normal 37. A normal to the curve 31 is drawn from the end point 33 to the display region 4, and a line segment from the end point 33 to a point where the normal to the curve 31 intersects with the outer periphery 4a of the display region 4 is defined as a fourth normal 38.

Furthermore, as for an intermediate point 34 on the curve 31 located between the starting point 32 and the end point 33, a normal to the curve 31 is drawn from the intermediate point 34 to the outer periphery 10a of the application region 10, and a line segment from the intermediate point 34 to a point where the normal to the curve 31 intersects with the outer periphery 10a of the application region 10 is defined as a fifth normal 39.

In this case, the curve 31 has a smoothly curved shape meeting conditions that the first normal 35 has a greater length than the second normal 36, the third normal 37 has a greater length than the fourth normal 38, and the fifth normal 39 has a smaller length than each of the first normal 35 and the third normal 37.

The curved shape meeting such conditions is gentler than the outer periphery 10a of the application region 10 because, in a region between the outer periphery 10a of the application region 10 and the outer periphery 4a of the display region 4, the starting point 32 and the end point 33 are closer to the outer periphery 4a of the display region 4 than to the outer periphery 10a of the application region 10, and the intermediate point 34 located between the starting point 32 and the end point 33 is closer to the outer periphery 10a of the application region 10 than the starting point 32 and the end point 33 are. The polarizing plate 8 having the curve 31 having such a curved shape is located within a range of the application region 10 to which the polarizing plate 8 can be applied, is shaped to have a range to cover the display region 4 as a whole, and, while meeting these conditions, has the curve 31 having a smaller curvature. This can mitigate stress concentration on the curve 31, and can suppress reduction in display quality and display failure of the liquid crystal display device 101 caused by stress concentration.

Embodiment 3

Figure 6:
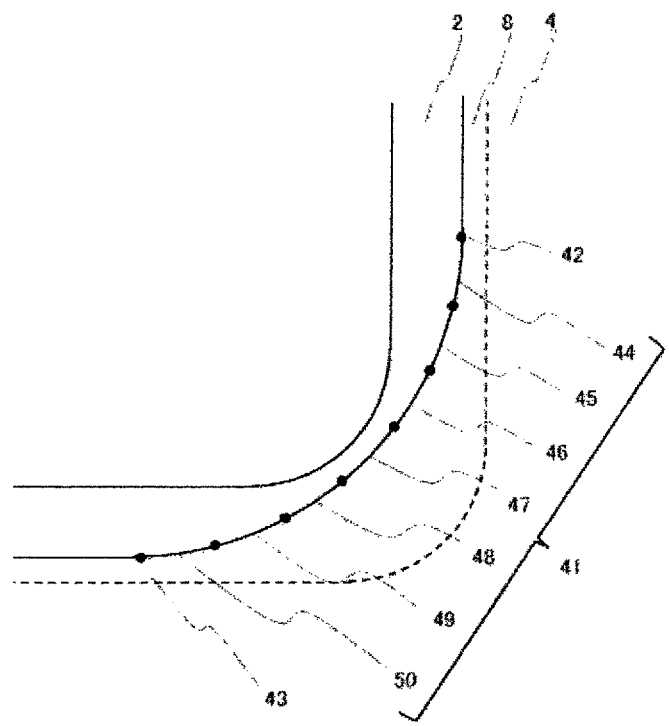
FIG. 6 is a plan view of an enlarged portion of a liquid crystal display device in Embodiment 3 of the present invention.

In Embodiments 1 and 2 described above, description has been made on the liquid crystal display device in which the curve 13 or the curve 31 of the polarizing plate 8 is caused to have an outer peripheral shape of a gentle concave curve smoothly connecting three points that are the starting point 14 or the starting point 32, the end point 15 or the end point 33, and the intermediate point 20 or the intermediate point 34 located between the starting point and the end point having a predetermined distance relationship with the application region to suppress stress concentration. In Embodiment 3, a liquid crystal display device in which the shape of the curve is set more particularly will be described. A configuration in Embodiment 3 is substantially similar to that of the liquid crystal display device 100 in Embodiment 1, and only differs in shape of the curve. FIG. 6 is a plan view of an enlarged portion around the curve of the liquid crystal display device in Embodiment 3.

In Embodiment 3, as in Embodiment 1, the outer peripheral shape of the color filter substrate 2 and the outer peripheral shape of the display region 4 along the outer peripheral shape of the color filter substrate 2 each have a recess, the outer peripheral shape of the polarizing plate 8 has a concave curve 41 in the region between the outer periphery of the color filter substrate 2 and the outer periphery of the display region 4, and the curve 41 is shaped to be closer to the display region 4 at a starting point 42 and an end point 43 thereof and to be closer to the outer periphery of the color filter substrate 2 at an intermediate point between the starting point 42 and the end point 43. The outer peripheral shape of the polarizing plate 8 is thus curved more gently than the outer periphery of the color filter substrate 2.

Furthermore, the concave curve 41 is composed of seven arcs 44 to 50 connected together, and any adjacent two arcs have different curvatures. The arc 47 located at the intermediate point on the curve 41 has the largest curvature, and the curvature decreases with increasing distance from the arc 47.

As described above, the curve 41 is shaped to be composed of a plurality of arcs, and arcs closer to opposite ends of the curve 41 are caused to have smaller curvatures, so that stress concentration at the starting point 42 and the end point 43 which are the opposite ends of the curve 41 can be mitigated to produce an effect of suppressing a malfunction caused by stress concentration. Although the curve 41 composed of the seven arcs 44 to 50 is illustrated in FIG. 6, the shape of the curve 41 can be brought closer to that of a gentle curve having a continuously changing curvature by increasing the number of arcs constituting the curve 41 and decreasing the length of each of the arcs.

Embodiment 4

Figure 7:
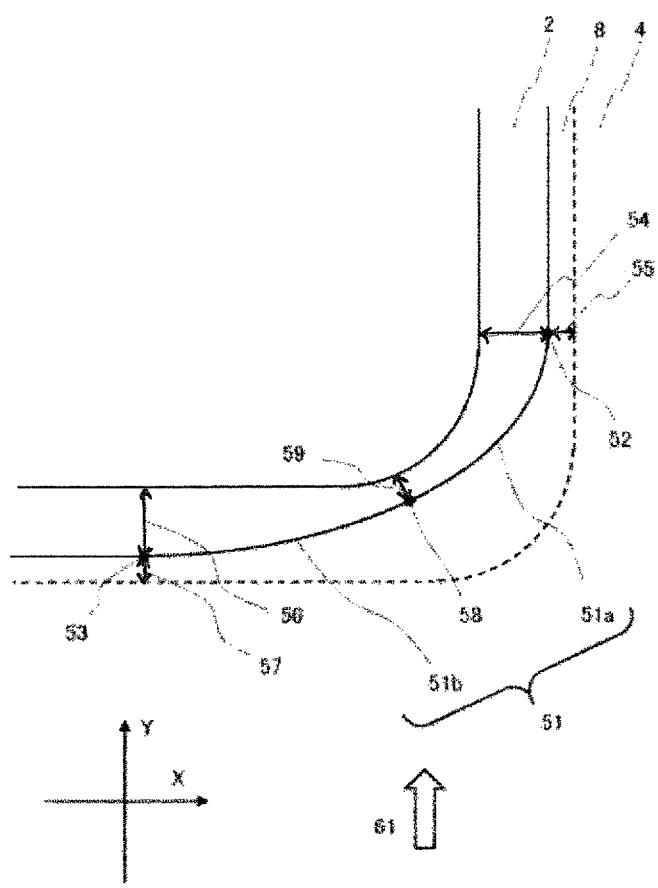
FIG. 7 is a plan view of an enlarged portion of a liquid crystal display device in Embodiment 4 of the present invention.

In Embodiment 1, description has been made on the liquid crystal display device in which the curve 13 of the polarizing plate 8 is caused to have an outer peripheral shape of a gentle concave curve smoothly connecting three points that are the starting point 14, the end point 15, and the intermediate point 20 located between the starting point and the end point having a predetermined distance relationship with the application region to suppress stress concentration. In Embodiment 4, a liquid crystal display device in which the shape of the curve is set in accordance with internal stress occurring due to an internal structure of the polarizing plate 8 to mitigate concentration of internal stress will be described. A configuration of the liquid crystal display device in Embodiment 4 is substantially similar to that of the liquid crystal display device 100 in Embodiment 1, and only differs in shape of the curve. FIG. 7 is a plan view of an enlarged portion around the curve of the liquid crystal display device in Embodiment 4.

In Embodiment 4, as in Embodiment 1, the outer peripheral shape of the color filter substrate 2 and the outer peripheral shape of the display region 4 along the outer peripheral shape of the color filter substrate 2 each have a recess, the outer peripheral shape of the polarizing plate 8 has a concave curve 51 in the region between the outer periphery of the color filter substrate 2 and the outer periphery of the display region 4, and the curve 51 is shaped to be closer to the display region 4 at a starting point 52 and an end point 53 thereof and to be closer to the outer periphery of the color filter substrate 2 at an intermediate point 58 between the starting point 52 and the end point 53. The outer peripheral shape of the polarizing plate 8 is thus curved more gently than the outer periphery of the color filter substrate 2.

In the polarizing plate 8 in Embodiment 4, the shape of the curve 51 is determined in accordance with a direction of an optical axis that is a direction of optical properties. The optical axis is related to the internal structure of the polarizing plate 8.

Assume that the polarizing plate 8 has an optical axis direction 61 of a Y direction when the horizontal direction and the vertical direction in FIG. 7 are respectively an X direction and the Y direction.

The optical axis of the polarizing plate will be described herein. The polarizing plate is produced by a process of stretching a polarizing film member to manufacture an original roll and a process of cutting out a piece having a shape as described above from the original roll to obtain the polarizing plate. In the process of manufacturing the original roll, an absorption axis is formed in the original roll in accordance with a direction of stretching. The absorption axis is referred to as the optical axis. After stretching to manufacture the original roll, compressive internal stress remains in the original roll in a direction perpendicular to the optical axis.

Furthermore, when the piece is cut out from the original roll to manufacture the polarizing plate having a shape as described above, internal stress applied to the outer periphery of the polarizing plate increases with decreasing angle formed by the outer periphery of the polarizing plate and a direction of the internal stress.

Thus, in a case where the curve 51 has been bent at an angle of 90° as in FIG. 7, that is to say, a tangent at the starting point 52 and a tangent at the end point 53 form an angle of 90°, any portion of the curve 51 has an outer edge in the same direction as the optical axis to form a portion in which internal stress is large.

The outer edge of the portion of the curve 51 in which internal stress is large is thus shaped to be as gentle as possible in accordance with the direction of internal stress occurring in association with the direction of the optical axis of the polarizing plate 8 to suppress stress concentration.

In Embodiment 4, the curve 51 has a shape as described below. First, the curve 51 is divided into a curve 51a from the starting point 52 to the intermediate point 58 and a curve 51b from the intermediate point 58 to the end point 53. The optical axis direction 61 of the polarizing plate 8 is the Y direction, and internal stress occurs in the X direction. The curve 51b of the polarizing plate 8 thus forms a large angle with the optical axis, and forms a small angle with the direction of internal stress, so that internal stress is large. The curve 51a of the polarizing plate 8 forms a small angle with the optical axis, and forms a large angle with the direction of internal stress, so that internal stress is small. The curve 51b is thus caused to have a smaller curvature than the curve 51a to cause the portion of the curve 51 in which internal stress of the polarizing plate 8 is large to have a smaller curvature to thereby mitigate stress concentration on a portion of the curve 51.

Although a case where the polarizing plate is manufactured from the polarizing film member has been described in the present embodiment, the polarizing plate may be manufactured from the polarizing film member and a phase difference film member bonded together. In such a polarizing plate, optical axes of the polarizing film member and the phase difference film member can be in the same direction or in different directions. As a result, internal stress caused by the optical axis of the polarizing film member and internal stress caused by the optical axis of the phase difference film can be both present in the polarizing plate, and directions thereof can differ from each other. In such a case, higher priority is required to be given to an optical axis having a larger influence, for example, on a malfunction caused by concentration of internal stress to reflect it to setting of the shape of the curve.

Internal stress of the polarizing plate can be caused not only by the optical axis but also by a direction of application of pressure when the polarizing plate is applied to the substrate. In a case where the magnitude of internal stress varies with direction due to the optical axis described above and other causes, stress concentration can be suppressed by setting the shape of the curve in accordance with the direction.

In Embodiments 1 to 4, the polarizing plate 8 applied to the color filter substrate 2 has been described from among the polarizing plates 7 and 8, but the same effect is produced by causing the polarizing plate 7 applied to the array substrate 1 on an opposite side of the liquid crystal cell 6 to have a similar shape. In a case where an optical film other than the polarizing plate is applied, the same effect is produced by causing the optical film to have a similar shape.

The number of polarizing plates 7 or 8 applied to the array substrate 1 or the color filter substrate 2 is one in description in Embodiments 1 to 4, but, in a case where the number of applied optical films is not one and a plurality of optical films are stacked to be applied, a similar effect is produced for each of the optical films. Furthermore, in a case where protective glass, a touch panel, and the like are stacked on the liquid crystal cell, and an optical film is applied to the surface thereof, the protective glass, the touch panel, and the like correspond to the substrate to which the optical film is applied, and the same effect is produced.

In Embodiments 1 to 4, description has been made on a case where the application region is within the outer periphery of the array substrate 1 or the color filter substrate 2, and the polarizing plate 7 or 8 is applied not to extend beyond the outer periphery of the array substrate 1 or the color filter substrate 2. However, in a case where protective glass larger than the liquid crystal cell 6 is stacked on the liquid crystal cell 6, for example, all or a portion of the outer periphery of the application region can be set to the outside of the outer periphery of the array substrate 1 or the color filter substrate 2 constituting the liquid crystal cell 6, and the polarizing plate 7 or 8 can be applied to extend beyond the outer periphery of the array substrate 1 or the color filter substrate 2 and not to extend beyond an outer periphery of the protective glass.

In Embodiments 1 to 4, description has been made by taking the liquid crystal display device in which the polarizing plates are applied as an example, but the display device is not limited to the liquid crystal display device. The same effect is produced, for example, by an organic electroluminescence (EL) display device in which the optical films are applied.

While the invention has been shown and described in detail, the foregoing description is in all aspects illustrative and not restrictive. It is therefore understood that numerous modifications and variations can be devised without departing from the scope of the invention.

What is claimed is:

1. A display device comprising:
    a substrate having, on a surface thereof, a display region to display an image; and
    an optical film applied within an application region, the application region being set on the surface of the substrate and having a recess on a portion of an outer peripheral shape thereof, wherein
    the optical film is shaped so that:
        an outer peripheral shape of the optical film has a concave curve along the recess of the application region;
        a first normal drawn from a starting point of the curve to an outer periphery of the application region has a greater length than a second normal drawn from the starting point of the curve to an outer periphery of the display region;
        a third normal drawn from an end point of the curve to the outer periphery of the application region has a greater length than a fourth normal drawn from the end point of the curve to the outer periphery of the display region; and
        a fifth normal drawn from a single point on the curve located between the starting point and the end point of the curve to the outer periphery of the application region has a smaller length than each of the first normal and the third normal.

2. The display device according to claim 1, wherein
    an outer peripheral shape of the substrate and the outer peripheral shape of the application region differ from each other.

3. The display device according to claim 1, wherein
    the curve is composed of a plurality of arcs, and the arcs each have curvature decreasing with decreasing distance to the starting point or the end point of the curve relative to the single point on the curve.

4. The display device according to claim 1, wherein
    the optical film has an optical axis in a direction of optical properties, and a shape of the curve is determined by a factor including an angle formed by a normal to the curve and the optical axis.

* * * * *